US006812943B1

(12) United States Patent
Day et al.

(10) Patent No.: US 6,812,943 B1
(45) Date of Patent: Nov. 2, 2004

(54) TAPE PRINTING APPARATUS

(75) Inventors: Robert Charles Lewis Day, Cambridge (GB); Mathew Richard Palmer, Cambridge (GB); Andrew Buchanan Halket, Cambridge (GB); Charles Robert Sims, Hertfordshire (GB)

(73) Assignee: Esselte, Sint-Niklaas (BE)

( * ) Notice: Subject to any disclaimer, the term of this patent is extended or adjusted under 35 U.S.C. 154(b) by 0 days.

(21) Appl. No.: 08/935,865

(22) Filed: Sep. 23, 1997

(30) Foreign Application Priority Data

Oct. 14, 1996 (GB) ............................................ 9621377

(51) Int. Cl.[7] ............................ B41J 2/315; B41J 2/32; G01D 15/10

(52) U.S. Cl. ...................................................... 347/171

(58) Field of Search ................................ 347/171, 207, 347/208, 214; 400/223, 703, 207, 208; 250/548; 242/338, 338.4, 344, 357

(56) References Cited

U.S. PATENT DOCUMENTS

| | | | | |
|---|---|---|---|---|
| 4,511,903 A | | 4/1985 | Miyazaki et al. | 347/193 |
| 4,642,658 A | * | 2/1987 | Arakawa | 347/218 |
| 4,683,478 A | * | 7/1987 | Suzaki et al. | 347/214 |
| 4,815,871 A | | 3/1989 | McGourty et al. | 400/120.16 |
| 4,966,476 A | | 10/1990 | Kuzuya et al. | 400/208 |
| 5,183,333 A | * | 2/1993 | Minowa | 400/605 |
| 5,610,648 A | * | 3/1997 | Sims et al. | 347/174 |
| 5,635,973 A | * | 6/1997 | Yamada | 347/171 |
| 5,821,975 A | * | 10/1998 | Gunther et al. | 347/217 |
| 6,380,965 B1 | * | 4/2002 | Sims et al. | 347/218 |

FOREIGN PATENT DOCUMENTS

| | | | |
|---|---|---|---|
| EP | 0 555 888 A2 | | 8/1993 |
| EP | 0 573 187 A1 | | 12/1993 |
| GB | 2 194 487 A | * | 3/1988 |
| JP | 06-024113 | * | 2/1994 |
| JP | 7-125393 | | 5/1995 |

OTHER PUBLICATIONS

Japanese Abstract, Brother Ind. Ltd., JP 7–125393, Okuchi Hiroyuki, Mar. 7, 1997.

* cited by examiner

*Primary Examiner*—Michael Nghiem
(74) *Attorney, Agent, or Firm*—Morgan, Lewis & Bockius LLP

(57) ABSTRACT

A tape printing apparatus having a thermal print head for printing an image on an image receiving tape, the print head having a first mode of operation for printing on an image receiving tape with an ink ribbon, and a second mode of operation for printing on thermally sensitive image receiving tape. A detector detects whether ink ribbon is present or absent in a receiving mechanism and provides a signal to a control mechanism indicative of the presence or absence of ink ribbon, the control mechanism being arranged to control the print head to have the first mode of operation when ink ribbon is present and the second mode of operation when no ink ribbon is present. When the ink ribbon is mounted on a rotatable member, the detector may detect the ink ribbon movement, or detect the location of the rotatable member where the location is different whether an ink ribbon is present or absent, or detect the speed of rotation of the rotatable support member where the rotatable member rotates at different speeds depending on whether ink ribbon is present or absent.

34 Claims, 6 Drawing Sheets

*Fig. 3*
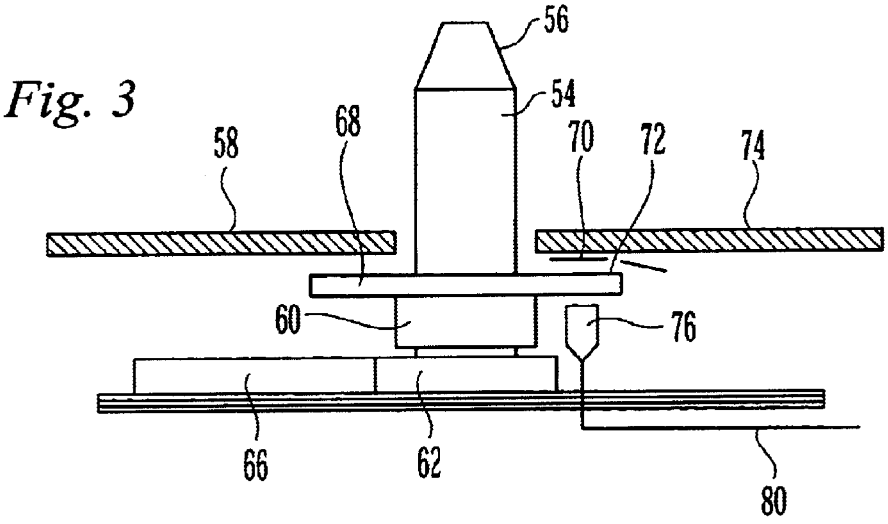
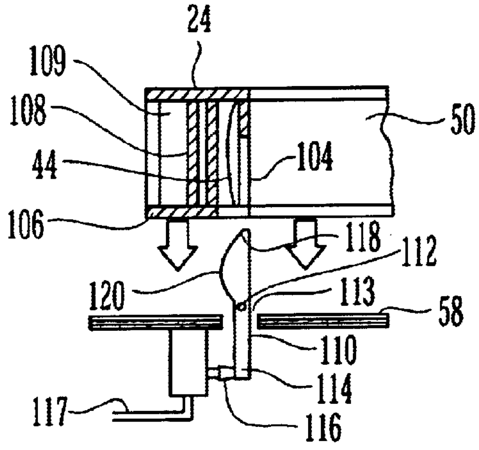
*Fig. 6a*
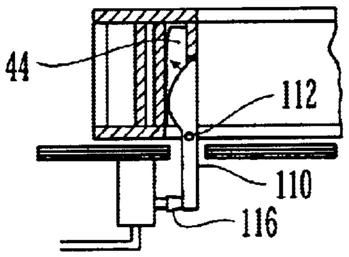
*Fig. 6b*
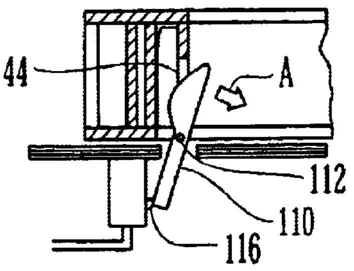
*Fig. 6c*

TAPE PRINTING APPARATUS

BACKGROUND OF THE INVENTION

1. Technical Field

The present invention relates to tape printing apparatus. The present invention also relates to tape holding cases for holding a supply of tape.

2. Prior Art

Known tape printing apparatuses of the type with which the present invention is generally concerned are disclosed in EP-A-322918 and EP-A-322919 (Brother Kogyo Kabushiki Kaisha) and EP-A-267890 (Varitronics). These tape printing apparatuses each include a cassette receiving bay for receiving a cassette or tape holding case. In EP-A-0267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double-sided adhesive tape which is secured at one of its adhesive coated sides to the image receiving tape after printing and which has a backing layer peelable from its other adhesive coated side. With both these apparatuses, the image transfer medium (ink ribbon) and the image receiving tape (substrate) are in the same cassette.

The present invention relates more closely to a different type of tape printing apparatus which is described for example in EP-A-578372, the contents of which are herein incorporated by reference. In this printing apparatus, the substrate tape is similar to that described in EP-A-267890 but is housed in its own tape holding case while the ink ribbon is similarly housed in its own tape holding case.

The known tape printing apparatuses have input means, for example a keyboard, to allow the user to input an image to be printed. A display is generally also provided to display the input image or messages to the user. A cutting arrangement is provided to separate the image receiving tape on which an image has been printed from the supply of image receiving tape to thereby define a label.

In the known tape printing apparatuses, the image receiving tape passes in an overlap fashion with the ink ribbon through a print zone consisting of a fixed print head and a platen against which the print head can be pressed to cause an image to transfer from the ink ribbon to the image receiving tape. This is usually done by thermal printing where the print head is heated and the beat causes ink from the ink ribbon to be transferred to the image receiving tape. This type of printing is known as thermal transfer printing. Alternatively, the print head may be in direct contact with a thermally sensitive image receiving tape whereby when the print head is heated, an image is printed directly on the image receiving tape. In this case, an ink ribbon is not required. This type of printing is known as direct thermal printing. It has been proposed by the present applicants that a tape printing apparatus be capable of printing an image on an image receiving tape using an ink ribbon and also directly on a thermally sensitive image receiving tape.

However, the print head operating characteristics required to print on thermally sensitive image receiving tapes and on image receiving tapes via an ink ribbon generally differ. Accordingly, the tape printing apparatus will generally have two modes of operation for the print head, depending on whether the print head is to carry out direct thermal printing or thermal transfer printing. It is therefore desirable that the tape printing apparatus be constructed such that tape printing apparatuses can determine whether the print head should be operable in a direct thermal printing mode or a thermal transfer printing mode.

SUMMARY OF THE INVENTION

According to a first aspect of the present invention, there is provided a tape printing apparatus for printing an image on an image receiving tape comprising:

a thermal print head for printing an image on the image receiving tape, the print head having a first mode of operation and a second mode of operation;

receiving means for receiving in the first mode of operation a supply of image receiving tape and a supply of ink ribbon for providing an image on the image receiving tape, and in the second mode of operation a supply of thermally sensitive image receiving tape;

driving means for driving the ink ribbon;

control means for controlling the thermal print head; and detecting means for detecting if ink ribbon is present or absent in the receiving means and arranged to provide a signal to the control means indicative of the presence or absence of ink ribbon, the control means being arranged to control the print head to have the first mode of operation when ink ribbon is present and the second mode of operation when no ink ribbon is present, wherein the detecting means is arranged to detect, when the driving means is activated, a characteristic indicative of movement of the ink ribbon to determine if ink ribbon is present.

Thus, a determination can be made as to whether or not ink ribbon is present and hence the mode of operation for the print head. The print head can thus have a first mode of operation in which thermal transfer printing can be successfully carried out and a second mode of operation in which direct thermal printing can be successfully carried out.

The ink ribbon may be rotatable mounted on a support member and the detecting means may be arranged to detect a characteristic indicative of rotational movement of the ink ribbon. In one embodiment of the present invention, the rotatable support members has a first speed of rotation when an ink ribbon is present and a second speed of rotation when no ink ribbon is present, and the detecting means is arranged to detect a characteristic indicating the speed of rotation of the rotatable support member. Thus, as the detecting means is able to detect a characteristic indicating speed of rotation of the rotatable support member and hence whether or not ink ribbon is present, it can be determined whether or not the print head is to have the first or second mode of operation.

In one embodiment of the present invention, the rotatable support means is driven by drive means, the rotatable support means rotating more quickly when no ink ribbon is present as compared to when ink ribbon is present. The rotatable support member may be arranged to support take-up means for taking up an ink ribbon, when present. In one preferred embodiment of the present invention, the ink ribbon is driven past the print head and once the print head has printed an image on the image receiving tape, the ink ribbon is taken up onto the take-up means. The take-up means may be in the form of a take-up reel. The presence of the ink ribbon on the rotatable support member acts as a brake and thus reduces the speed of rotation of the driven support member. Preferably, the rotatable support member is coupled via a slipping clutch to a driving gear of the drive means, whereby when no ink ribbon is present, the support member rotates at the same speed as the driving gear and when an ink ribbon is present, the slipping clutch slips so that the rotatable support member rotates at a lower speed than the driving gear.

The support member for supporting the supply of ink ribbon may be freely rotatable such that the rotatable support member is substantially stationary when no ink ribbon is present and rotates when an ink ribbon is present. The supply of ink ribbon may be the unused supply of ink ribbon which is subsequently used to print an image on the image receiving tape. It should be appreciated that in some embodiments of the present invention, a take-up reel and/or a reel for holding a supply of ink ribbon may be provided. Characteristics of the support member for one or other or both of these reels or of the reels themselves may be used to determine if an ink ribbon is present.

The reel for the ink ribbon may be supported on the rotatable support member and the detecting means may be arranged to monitor the speed of rotation of the reel to provide an indication of the speed of rotation of the support member. The reel can support the supply of ink ribbon, prior to its use or take-up the supply of ink ribbon after the printing of an image thereby. The reel may be provided with a surface having a plurality of markings, the detecting means being arranged to detect the markings as the reel rotates with the rotatable support means to provide an indication of the speed of rotation. Those markings may take the form of, for example, reflective marking interspersed with less reflective regions. The detecting means may take the form of a light source and light detector which is arranged to detect the reflective markings.

A member may be provided on the rotatable support member which rotates therewith and the detecting means may be arranged to detect the rotation of the member to provide an indication of the speed of the rotatable support means. The member may be in the form of a disc having a plurality of markings and the detecting means may be arranged to detect the markings as the disc rotates with the rotatable support member to provide an indication of the speed of the support member. The markings may comprise a plurality of holes in the disc and the detecting means may comprise a light source and detector. Alternatively, the markings can comprise reflective regions interspersed with less reflective regions. It should be appreciated that any suitable form of electromagnetic radiation can be used in the detecting means and not just visible light.

The detecting means may comprise a movable member having a first position when an ink ribbon is present and a second position when no ink ribbon is present and the detecting means may be arranged to determine the position of the movable member. The movable member may be arranged to be in the second position when a supply of ink ribbon is present and stationary and to move to the first position only when the ink ribbon is driven by the drive means. Thus, as the ink ribbon is driven by the drive means, the tension in the ink ribbon increases which causes the movable member to adopt the second position.

The detecting means may be arranged to detect a characteristic indicative of the power consumed by the drive means, the drive means being arranged such that the power consumed thereby is greater when an ink ribbon is present as compared to when no ink ribbon is present. The characteristic indicative of the power of the drive means way be the drive current applied thereto or alternatively may be the load on the drive means. The load may be greater when an ink ribbon is present as compared to when an ink ribbon is not present.

Means may be provided for determining when a supply of image receiving tape is first inserted or replaced whereby the tape printing apparatus is arranged so that the mode of operation of the print head is only determined when the determining means determines that a supply of image receiving tape has been inserted or replaced. Thus, the number of checks which need to be made to determine the mode of operation can be reduced. This is advantageous particularly with those embodiments where a small amount of image receiving tape and/or ink ribbon has to be driven through the apparatus in order to determine the mode of operation.

According to a second aspect of the present invention, there is provided a tape printing apparatus for printing a label on an image receiving tape comprising:

a thermal print head arranged at a print zone for printing the label on the images receiving tape as the image receiving tape passes through the print zone, the print head having a first mode of operation and a second mode of operation;

control means for controlling the thermal print head;

receiving means for receiving in the first mode of operation a supply of image receiving tape and a supply of ink ribbon for providing an image on the image receiving tape and in the second mode of operation a supply of thermally sensitive image receiving tape;

detecting means for detecting a characteristic indicative of the presence or absence of ink ribbon and arranged to provide a signal to the control means indicative of the presence or absence of ink ribbon, wherein the control means controls the print head to have the first mode of operation when ink ribbon is present and the second mode of operation when no ink ribbon is present; and cutting means for separating a printed label from the supply of image receiving tape.

Preferably, a support member is provided for supporting an ink ribbon, the support member having a first position when an ink ribbon is present and a second position when no ink is present, the detecting means being arranged to detect a characteristic indicative of the position of the support member to determine if an ink ribbon is present or absent. The support member may support a supply of unused ink ribbon or the ink ribbon which has already been used.

The support member may be a rotatable support member having gear means, the gear means having a first position in which the gear means is coupled to the drive means when the ink ribbon is present and the second position when an ink ribbon is not present, the detecting means being arranged to detect a characteristic indicative of whether the gear means is in a first position or a second position. In the second position, the gear means may be uncoupled from the drive means.

The detecting means may be arranged to detect the position of the gear means. Alternatively or additionally, the detecting means may be arranged to detect the position of the support member.

In one preferred embodiment of the present invention in which the image receiving tape and the ink ribbon are received in a first cassette in the first mode of operation and the thermally sensitive image receiving tape is received in a second cassette in the second mode of operation, the first cassette is arranged to have an aperture in a first location for receiving the support member and the second cassette has an aperture for receiving the support member in a second location such that the first cassette causes the rotatable support means to be in the first position and the second cassette causes the rotatable support member to be in the second position.

The detecting means may be arranged to determine if an ink ribbon is present along a portion of an ink ribbon. The detecting means may comprise a first emitting element and a second detecting element, wherein the first emitting element is arranged to emit a signal which interacts with the ink ribbon when present and the detecting element, depending on whether or not ink ribbon is present, either receives or does not receive a signal emitted by the emitting element. The detecting element and the emitting element may be arranged on the same side of the ink ribbon or opposite sides of the ink ribbon. In the first case, the detecting means would receive a signal from the emitting means when an ink ribbon is present and in the second case, the detecting means would receive a signal from the emitting element when no ink ribbon is present. The emitting means may provide any suitable form of signal, for example visible, ultra violet or infra red light.

It should be appreciated that features of the first aspect of the present invention can be used with the second aspect of the present invention and vice versa.

Preferably, in the first mode of operation of the print head, the print head energy requirements are at a first level and in the second mode of operation of the print head, the print head energy requirements are at a second level Preferably, the print head energy requirements are altered by changing one or more of the following parameters:

voltage applied to each printing element of the print head;

length of time for which each printing element of the print head is activated; and the number of times that the printing elements of the print head are activated for the same set of data.

Preferably, in the first mode of operation, the image receiving tape and the ink ribbon are received in a single cassette. Alternatively, the image receiving tape and ink ribbon may be received in separate cassettes. In the second mode of operation, the thermally sensitive image receiving tape is preferably received in a cassette.

According to a third aspect of the present invention, there is provided a cassette comprising a housing in which a reel holding a supply of tape is arranged, the reel being rotatable with respect to the housing and having a plurality of markings thereon, the housing being arranged so that the markings are detectable by a detecting arrangement external to the cassette to provide information relating to the rotation of the reel.

The tape may be an ink ribbon. The reel may support a reel of unused ink ribbon or a supply of ink ribbon which has been used. Preferably the housing is provided with an opening through which the markings are detectable. The opening may comprise substantially transparent material.

According to a further aspect of the present invention, there is provided a tape printing apparatus for printing an image on an image receiving tape comprising:

a thermal print head for printing an image on the image receiving tape, the print head having a first mode of operation and a second mode of operation;

receiving means for receiving in the first mode of operation a supply of image receiving tape and a supply of ink ribbon for providing an image on the image receiving tape, and in the second mode of operation a supply of thermally sensitive image receiving tape;

control means for controlling the thermal print head;

means for directing the image receiving tape along a first path in the first mode of operation and along a second path in a second mode of operation;

detecting means for determining if the image receiving tape follows the first or the second path and arranged to provide a signal to the control means indicative of the path of the image receiving tape, the control means being arranged to control the print head to have the first mode of operation if the image receiving tape follows the first path and the second mode of operation if the image receiving tape follows the second path.

According to a still further aspect of the present invention, there is provided a tape printing apparatus for printing an image on an image receiving tape comprising:

a thermal print head for printing an image onto an image receiving tape, the print head having a first mode of operation and a second mode of operation;

receiving means for receiving in the first mode of operation a supply of image receiving tape and a supply of ink ribbon for providing an image on an image receiving tape, and in the second mode of operation a supply of thermally sensitive image receiving tape;

control means for controlling the thermal print head;

drive means for driving the image receiving tape and the ink ribbon, when present, past the print head; and means for detecting a characteristic indicative of the presence or absence of an ink ribbon and arranged to provide a signal to the control means indicative of the presence or absence of the ink ribbon, the control means controlling the print head to have the first mode of operation when an ink ribbon is present and the second mode of operation when no ink ribbon is present, wherein the detecting means is arranged to detect a characteristic indicative of the power consumed by the drive means, the drive means consuming more power when an ink ribbon is present as compared to when no ink ribbon is present.

According to a further aspect of the present invention, there is provided a tape printing apparatus for printing an image on an image receiving tape comprising:

a thermal print head for printing an image on the image receiving tape, the print head having a first mode of operation and a second mode of operation;

receiving means for receiving in the first mode of operation a supply of image receiving tape and a supply of ink ribbon for providing an image on the image receiving tape, and in the second mode of operation a supply of thermally sensitive image receiving tape;

control means for controlling the print head;

drive means for driving the image receiving tape and ink ribbon, when present, past the print head;

detecting means for detecting a characteristic indicative of the presence or absence of ink ribbon and arranged to provide a signal to the control means indicative of the presence or absence of an ink ribbon, the control means controlling the print head to have the first mode of operation when an ink ribbon is present and the second mode of operation when no ink ribbon is present, and the detecting means is arranged to detect the load applied to the drive means, the load applied to the drive means being greater when ink ribbon is present as compared to when no ink ribbon is present.

BRIEF DESCRIPTION OF THE DRAWINGS

For a better understanding of the present invention and as to how the same may be carried into effect, reference will now be made by way of example to the accompanying drawings in which:

FIG. 3 shows a first arrangement for determining the mode of operation of the tape printing apparatus;

FIGS. 6*a* to 6*c* show a forth arrangement for determining the mode of operation of the tape printing apparatus;

DESCRIPTION OF THE PREFERRED EMBODIMENTS

Figure 1:
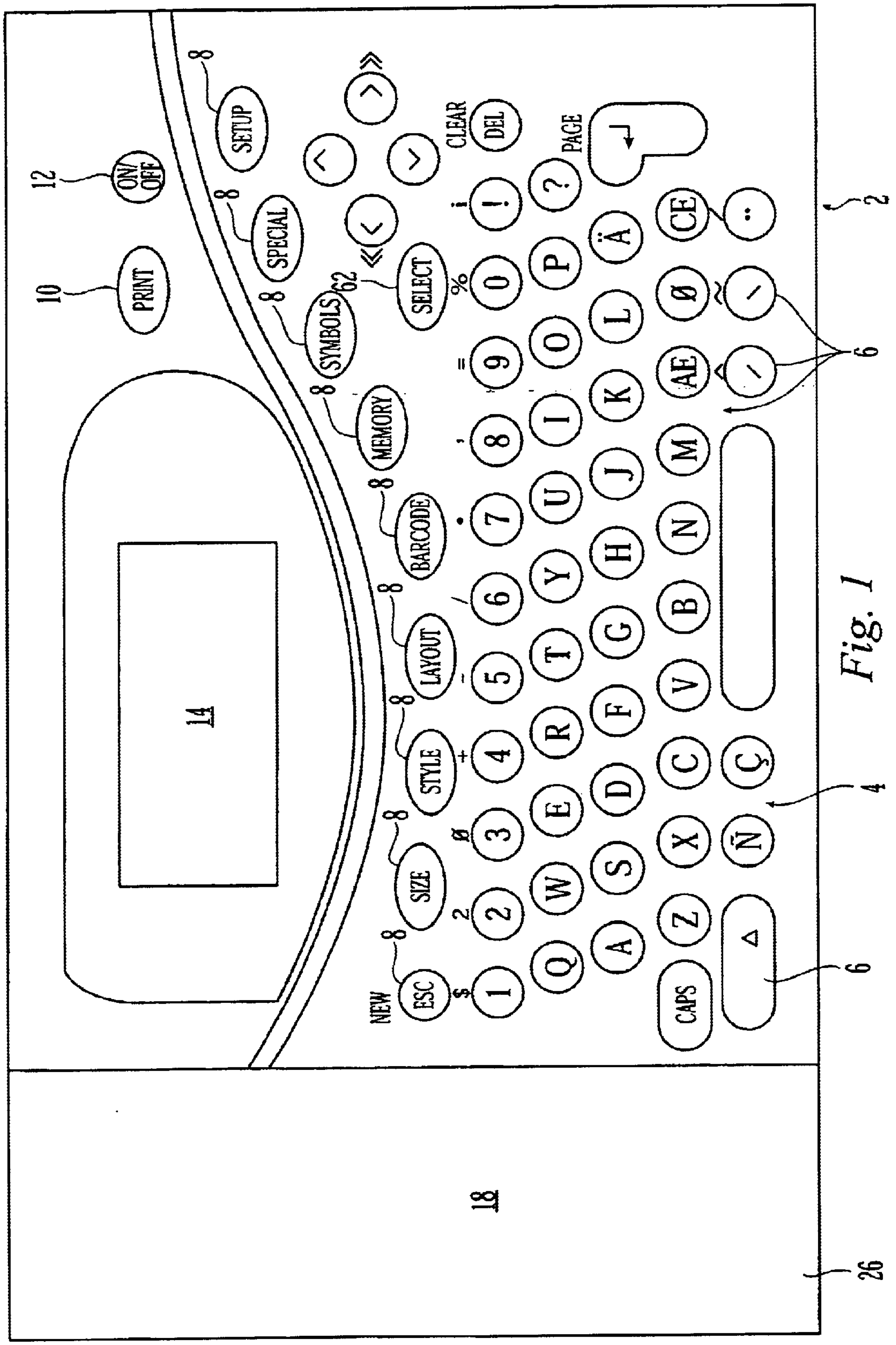
FIG. 1 is a plan view showing the front of a tape printing apparatus.

FIG. 1 shows a simplified plan view of a tape printing apparatus 2. The tape printing apparatus 2 comprises a keyboard 4 having a plurality of data entry keys in the form of, for example, numbered, lettered and punctuation keys 6 for inputting data to be printed as a label. The keyboard 4 also includes a plurality of function keys 8 for editing the input data. Additionally, the keyboard 4 has a print key 10 which is operated when it is desired that a label be printed. An on/off key 12 for switching the tape printing apparatus on and off is provided on the keyboard 4.

The tape printing apparatus 2 has a liquid crystal display (LCD) 14 which displays the data as it is entered. The display 14 allows the user to view all or part of the label to be printed which facilitates the editing of the label prior to its printing. The display 14 can also display messages to the user, such as error messages and the like. The display 14 is driven by a display driver 16 which can be seen in FIG. 9.

Next to the keyboard 4 of the tape printing apparatus 2, there is a cassette receiving bay 18 which is arranged to receive either one cassette or two cassettes 22 and 24 depending on the mode of operation of the tape printing apparatus 2. This will be described in more detail thereinafter.

Figure 2:
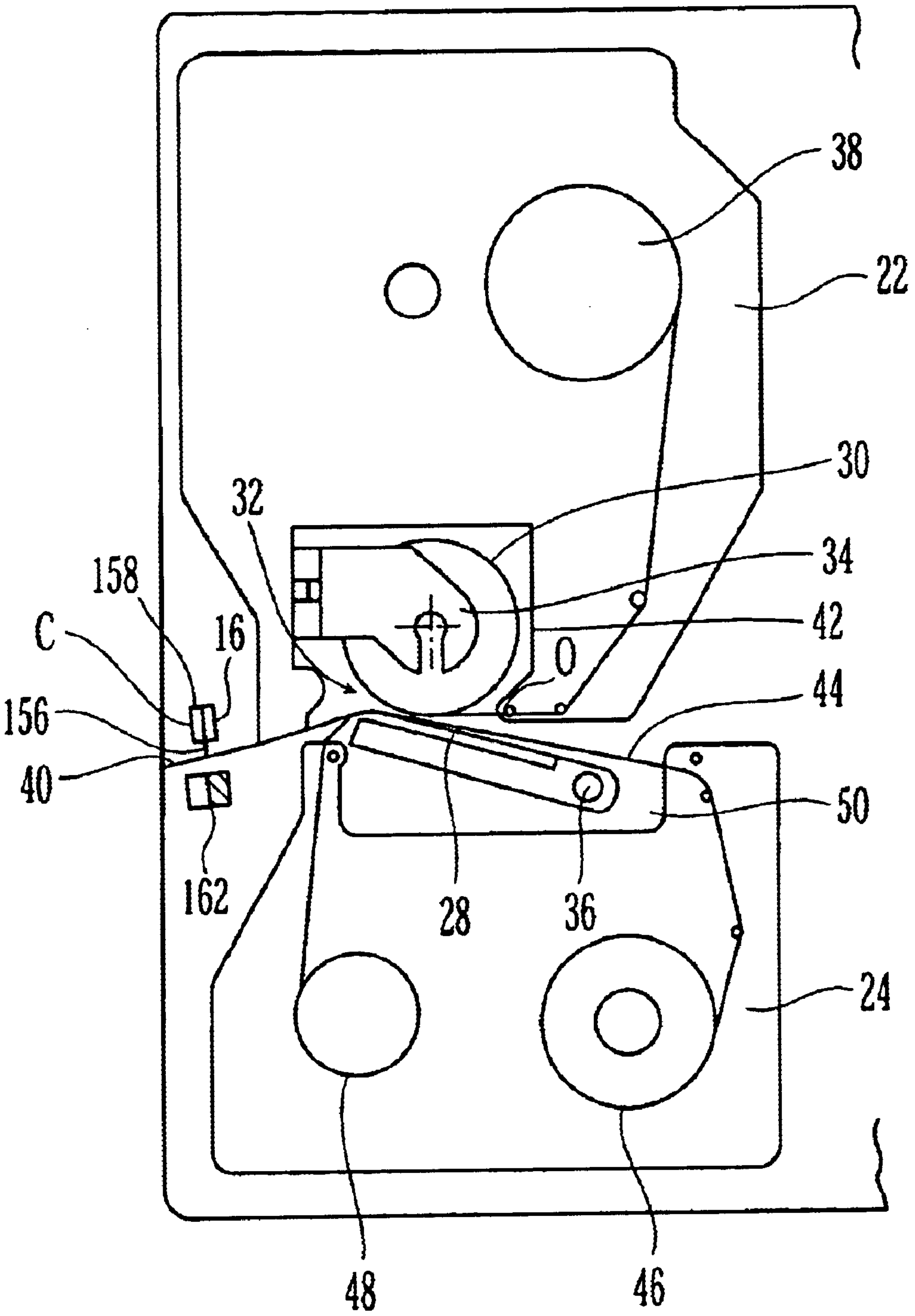
FIG. 2 is a plan view of two cassettes inserted in the tape printing apparatus of FIG. 1.

The cassette receiving bay 18 has a lid 26 which is normally closed during operation of the tape printing apparatus 2. FIG. 2 shows the interior of the cassette receiving bay 18 with the lid 26 removed. The cassette receiving bay 18 includes a thermal print head 28 and a platen 30 which cooperate to define a print zone 32. The platen 30 is mounted for rotation within a cage moulding 34. The print head 28 is pivotable about a pivot point 36 so that it can be brought into contact with the platen 30 for printing and moved away from the platen 30 to enable the cassettes 22 and 24 to be removed and replaced.

The first cassette 22 holds a supply spool 38 of image receiving tape 40. The image receiving tape 40 comprises an upper layer for receiving a printed image on one of its surfaces and has its other surface coated with an adhesive layer to which is secured a releasable backing layer. The image receiving tape 40 is guided by a guide mechanism (not shown) through the cassette 22, out of the cassette 22 through an outlet O, past the print zone 32 to a cutting location C. The platen 30 is accommodated in a recess 42 of the first cassette 22.

The second cassette 24 has a supply of ink ribbon 44 on an ink ribbon supply spool 46 and an ink ribbon take up spool 48. The second cassette 24 has a recess 50 for receiving the print head 28. The image receiving tape 40 and the ink ribbon 44 are arranged to pass in an overlap fashion between the print head 28 and the platen 30. In particular, the image receiving layer of the image receiving tape 40 is in contact with the ink ribbon 44. The ink ribbon 44 is a thermal transfer ribbon which when in contact with the activated or heated elements of the thermal print head 28 defines an image on the image receiving tape 40.

The platen 30 is driven by a motor 64 (see FIG. 9) so that it rotates to drive the image receiving tape 40 in a direction which is parallel to the lengthwise extend of the image receiving tape 40 through the print zone 32. In this way, an image is printed on the image receiving tape 40 and the image receiving tape 40 is fed from the print zone 32 to the cutting location C. The rotation of the platen 30 also causes the ink ribbon 44 to be driven from the ink ribbon supply spool 46, past the print head 28 and to the ink ribbon take up spool 48.

In the first mode of operation illustrated in relation to FIG. 2, an image is printed on the image receiving tape 40 through the medium of an ink ribbon 44. This type of printing is known as thermal transfer printing. In the second mode of operation, an image is printed by the print head 28 directly onto a thermally sensitive image receiving tape 40. Thus, an ink ribbon is not required in this second mode of operation in order to provide an image on the image receiving tape. This type of printing is known as direct thermal printing. Accordingly, in the second mode of operation, only a single cassette, containing a supply thermally sensitive image receiving tape 40 is used. A second cassette containing ink ribbon is therefore not required.

The print head 28 is a thermal print head comprising a column of a plurality of printing elements. The print head 28 is preferably only one element wide and the column extends in a direction perpendicular to the lengthwise direction of the image receiving tape 40. The height of the column of printing elements is preferably equal to the width of the image receiving tape 40 to be used with the tape printing apparatus 2. With embodiments of this invention where more than one width of image receiving tape 40 is used, the print head column will generally have a height equal to or suitable for printing on the largest width of tape 40. An image is printed on the image receiving tape 40 column by column by the print head 28. If the tape printing apparatus 2 is in the first mode of operation, the image is printed on the image receiving tape 40 via the ink ribbon 44. Alternatively, if the tape printing apparatus 2 is in the second mode of operation, an image would be directly applied by the print head 28 to the image receiving tape 40 without the need for an ink ribbon 44. The print head energy requirements generally differ for these two modes of operation. In particular, one or more of the following print head operating parameters may differ in the two modes of operation:

voltage applied to the printing element;

length of time for which each printing element is activated; and the number of times that the printing elements are activated for the same set of pixel or print data.

For example, in the first mode of operation, the printing elements could be activated once for each set of pixel or print data and in the second mode of operation, the printing elements could be activated twice for each set of pixel or print data.

The print head 28 operating parameters selected will depend entirely on the characteristics of the image receiving tape used in the second mode of operation and the characteristics of the image receiving tape and ink ribbon used in the first mode of operation. So that the print head 28 can be controlled in an appropriate manner, the tape printing apparatus 2 is provided with an indication as to whether the print head 28 should be operating in the first or the second mode.

Reference will now be made to FIG. 3 which shows a first embodiment of the present invention for determining whether the print head 28 is to operate in the first mode or the second mode. In particular, FIG. 3 shows a sectional view through part of the cassette receiving bay 18, with no cassettes present. The ink ribbon take up spool 48 of the ink ribbon cassette 24 is driven by a rewind sprocket 54 of the tape printing apparatus 2 so as to take up the ink ribbon 44 after an image has been printed thereby on the image receiving tape 40. The rewind sprocket comprises a post 56 which engages with the ink ribbon take up spool 48 of the ink ribbon cassette 24, when present. The post 56 extends above the floor 58 of the cassette receiving bay 18. The rewind sprocket 54 is connected via a wrap spring clutch 60 to a sprocket gear 62 of a gear train. This gear train is coupled to the motor 64 (see FIG. 9) which drives the gear train. More particularly, the sprocket gear 62 is coupled to an idler gear 66.

Also mounted on the rewind sprocket 54 is a slotted sprocket flange 68. This flange 68 is arranged below the cassette receiving bay floor 58 and has a plurality of evenly spaced slots arranged around the circumference thereof The flange 68 is coupled to the rewind sprocket 54 such that it rotates therewith. A reflective tape 70 is positioned between the upper surface 72 of the sprocket flange 68 and the underside 74 of the cassette receiving bay floor 58. The reflective tape 70 may be arranged on the underside 74 of the cassette receiving bay floor 58. The position of the reflective tape 70 is selected so that it is in alignment with the slots of the flange 68 as they rotate past the reflective tape 70. A sensing arrangement 76 is arranged below the sprocket flange 68. The sensing arrangement 76 consists of a source of, for example, light and may be in the form of a light emitting diode (LED). The sensing arrangement 76 also comprises a detector for detecting light emitted by the LED and reflected to the detector by the reflective tape 70. This detector may take the form of a photo transistor.

The operation of this embodiment will now be described. When a cassette 24 including a supply of ink ribbon 44 is inserted into the tape printing apparatus 2, the ink ribbon take up spool 48 is received on the rewind sprocket 54. If a label is to be printed, the motor 64 drives the gear train including the sprocket gear 62. However, the presence of the ink ribbon 44 acts as a brake on the rewind sprocket 54. The wrap spring clutch 60 then slips so that the rewind sprocket 54 rotates at a slower rate than the sprocket gear 62 which drives it. Clearly, the presence of an ink ribbon 44 indicates that the tape printing apparatus 2 is to operate in the first mode. In the second mode of operation in which an image is printed directly onto the image receiving tape 40 by the print head 28, there is no ink ribbon 44 present. Consequently, there is no braking effect on the rewind sprocket 54 and the rewind sprocket 54 therefore rotates at the same rate as the sprocket gear 62.

In order to differentiate between the two modes, the sprocket flange 68 acts as an encoder wheel to provide an indication of the speed of the rewind sprocket 54. In particular, as the flange 68 rotates with the rewind sprocket 54, light is continually emitted by the light source of the sensing arrangement 76. If the light source of the sensing arrangement 76 is aligned with an opening or slot of the sprocket flange 68, the light will impinge on the reflective tape 70 and be reflected back to the detector of the sensing arrangement 76. However, if the light source is aligned with a region between two openings or slots of the sprocket flange 68, the amount of light reflected back to the detector is significantly reduced. A microprocessor chip 78 (see FIG. 9) thus receives a signal via line 80 which is indicative of the number of slots of the flange 68 passing the sensing arrangement 76 in a given time frame. This therefore provides an indication of the speed of the rewind sprocket 54. If the microprocessor chip 78 determines that the sprocket 54 is rotating relatively slowly, indicating that a supply of ink ribbon 44 is present then the print head 28 of tape printing apparatus 2 will be controlled to operate in the first mode of operation. Alternatively, if the speed of the rewind sprocket 54 is determined by the microprocessor chip 78 to be relatively fast indicating that no ink ribbon is present, then the tape printing apparatus 2 will be controlled to operate in the second mode of operation.

The detected speed of rotation of the sprocket 54 can be compared with reference values stored in the microprocessor chip 78 to determine the mode of operation for the print head 28. Alternatively, the detected speed of rotation of the sprocket 54 can be compared to the current speed of rotation of the sprocket gear 62. For example, the speed of the motor 64 can be detected in any suitable manner, such as by using a shaft encoder arranged on a shaft of the motor 64. Alternatively, the speed of the motor 64 can be estimated by measuring the drive current applied to the motor 64. It should be appreciated that the speed of rotation of the motor 64 and the speed of rotation of sprocket gear 62 may be different due to the nature of the gear train therebetween. However the microprocessor chip 78 could be programmed to take this into account. It would of course also be possible to directly measure the speed of the sprocket gear 62 and to compare the rotation speed of the sprocket gear 62 with that of the sprocket flange 72.

In order to determine the mode of operation of the tape printing apparatus 2, it is necessary to drive any ink ribbon and consequently also the image receiving tape 40 for a short distance. In one embodiment of the present invention, the extra image receiving tape 40 which is fed through the tape printing apparatus 2 in order to determine the mode of operation is simply cut off. A message may be displayed to the user indicating that the extra image receiving tape should be cut off Alternatively, the tape printing apparatus may be arranged automatically to cut off the excess image receiving tape 40. Alternatively, the extra image receiving tape 40 could be driven back into the tape printing apparatus 2, for example back into the cassette 22, before the printing operation commences to reduce wastage. In this embodiment, a one way drive limiter, such as a ratchet, is fitted to the rewind sprocket 56 to prevent the winding of the ink ribbon 44 from the take up spool 48 during the driving back of the image receiving tape into the cassette although this in practice might not be necessary.

In a refinement to this embodiment, a senor for example in the form of a microswitch or switch is provided to detect when a cassette has been removed and replaced and/or to detect if the cassette bay lid 26 has been opened. The tape printing apparatus is arranged to carry out the necessary steps in order to determine the mode of operation for the print head only when an indication is received by the microprocessor chip 78 from the sensor that the cassette has been removed and replaced or that the lid 26 has been opened. The microswitch or switch may be necessary steps in order to determine the mode of operation for the print head only when an indication is received by the microprocessor chip 78 from the sensor that the cassette has been removed and replaced or that the lid 26 has been opened. The microswitch or switch may be arranged so as to have a first position when a cassette is in the cassette receiving bay and a second position when the cassette is not in the cassette receiving bay. The cassette may itself cause the microswitch to adopt the first position and when the cassette is removed the microswitch is arranged automatically to adopt the second position. The cassette may be the cassette containing ink ribbon but is more preferably the cassette containing the image receiving tape.

Alternatively, one contact of a switch may be provided on the lid 26 of the cassette receiving bay and a second contact of the switch may be provided on the main body of the tape printing apparatus so that when the lid 26 is closed, contact is made between the two contacts. When the lid 26 is open, the contact between the two contacts is broken.

In both of the above described arrangements the switch or microswitch is arranged to provide a signal to the microprocessor chip 78 even when the tape printing apparatus is "off". Batteries or back-up batteries provide the necessary power when the tape printing apparatus 2 is off Once the microprocessor chip 78 makes a determination as to whether the tape printing apparatus 2 is to operate in the first or the second mode of operation, this information is stored and the print head 28 controlled accordingly. A further determination as to the mode of operation is only made if it is determined by the microprocessor chip that the lid 26 has been opened or that a cassette has been removed. If one of these conditions is detected then the tape printing apparatus 2 makes a determination as to the required mode of operation for the print head 28. If the tape printing apparatus 2 is off, this determination is made when the tape printing apparatus is next turned on. In this way, the number of times which an apparatus needs to carry out checks to ascertain the mode of operation can be reduced as a check to determine the mode of operation is only carried out if a condition indicative that a cassette is likely to have been changed is detected.

When the tape printing apparatus 2 incorporating this modification has determined the speed of the rewind sprocket 54 and hence the mode of operation of the print head 28 of the tape printing apparatus 2, the tape printing apparatus 2 may drive the image receiving tape 40 back into the tape printing apparatus as outlined above. Alternatively, the tape printing apparatus 2 could be arranged to display a message on the display 14 advising the user to cut off the excess image receiving tape 40.

In a further modification to this embodiment, a sensor is provided to check if image receiving tape is present. Only if image receiving tape is present, does the apparatus 2 check to see if ink ribbon is present in order to determine the mode of operation. The means for sensing whether or not image receiving tape is present can take any suitable form such as, for example, a switch which has a first position when a cassette of image receiving tape is present and a second position when a cassette of image receiving tape is not present. This switch may be the same switch used to determine when a cassette has been removed and replaced.

In one modification to the embodiment shown in FIG. 3, the light source and light detector of the sensing arrangement 76 may be arranged on opposite sides of the sprocket flange 68.

In a further modification to the embodiment described in relation to FIG. 3, the sprocket flange 68 and sensing arrangement 76 are dispensed with. Instead of detecting the rotational speed of the rewind sprocket for supporting the ink ribbon take up spool 48, the power of the motor 64 is detected. When a cassette 24 containing a supply of ink ribbon 44 is present, the power output of the motor is greater than if the cassette containing the ink ribbon 44 was not present. In other words, the power required to drive the ink ribbon and the image receiving tape through the tape printing apparatus 2 is greater than the power required only to drive the image receiving tape 40. Any suitable method can be used in order to detect the power of the motor. For example, the drive current required by the motor can be measured. The greater the drive current, the greater the power. The measured drive current values can be compared with reference values stored in the microprocessor chip 78. Alternatively, since the presence of a cassette 24 containing a supply of ink ribbon 44 increases the load on the gear train provided to drive the image receiving tape 38 and ink ribbon 44, the tape printing apparatus can be arranged to measure the load on the gear train. If the load is relatively high, the microprocessor chip 78 can make a determination that ink ribbon is present and hence that the tape printing apparatus 2 should operate in the first mode. If the load is relatively low, then the tape printing apparatus 2 is controlled to operate in the second mode.

Figure 4:
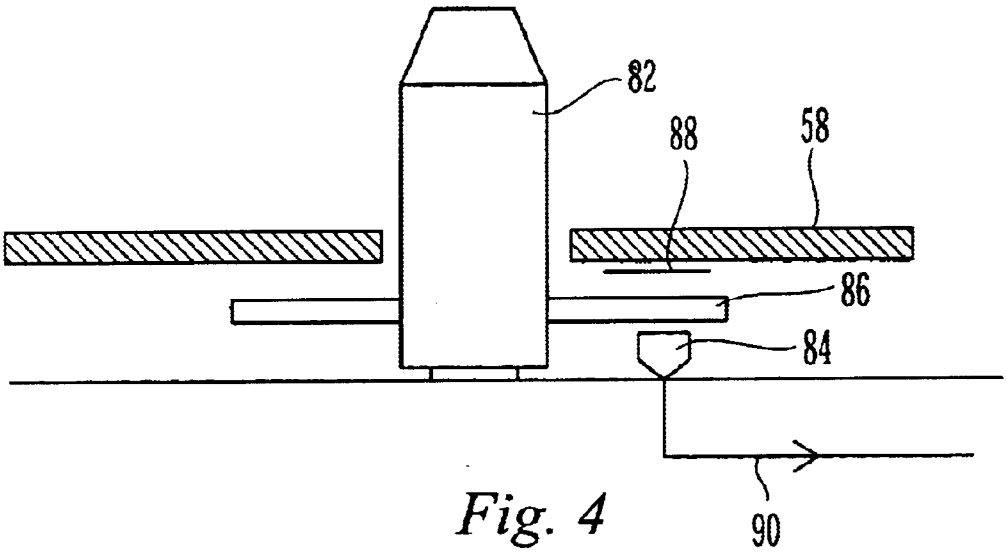
FIG. 4 shows a second arrangement for determining the mode of operation of the tape printing apparatus.

An alternative embodiment of the present invention for determining the mode of operation of the tape printing apparatus 2 is shown in FIG. 4. The arrangement shown in FIG. 4 is similar to that shown in FIG. 3. A cross-section through part of the cassette receiving bay 18 is illustrated, again with no cassette present. The post 82 shown supports the ink ribbon supply spool 46. However, this post 82 is not directly driven by the motor 64. When a supply of ink ribbon 44 is present, the ink ribbon 44 is drawn by the action of the platen 30 against the print head 28 from the ink ribbon supply spool 46 and is taken up by the ink ribbon take up spool 48 which is directly driven. Accordingly, rotation of the post 82 only occurs when a supply of ink ribbon 44 is present. Using a sensing arrangement 84 which is the same as that shown in relation to FIG. 3 in combination with a slotted flange 86, it is possible for the microprocessor chip 78 to determine whether or not the post 82 is rotating and hence the mode of operation of the print head 28 of the tape printing apparatus 2. Rotation of the post 82 means that ink ribbon 44 is present and that accordingly the print head 28 has the first mode of operation. If no rotation of the post 82 is detected, then it can be determined that the print head 28 should have the second mode of operation. As with the embodiment shown in FIG. 3, a reflective tape 88 is provided between the floor 58 of the cassette receiving bay 18 of the tape printing apparatus 2 and the slotted flange 86. A signal line 90 is provided between the sensing arrangement 84 and the microprocessor chip 78. The problem of tape wastage can be dealt with in the same manner as outlined in relation to FIG. 3.

Figure 5:
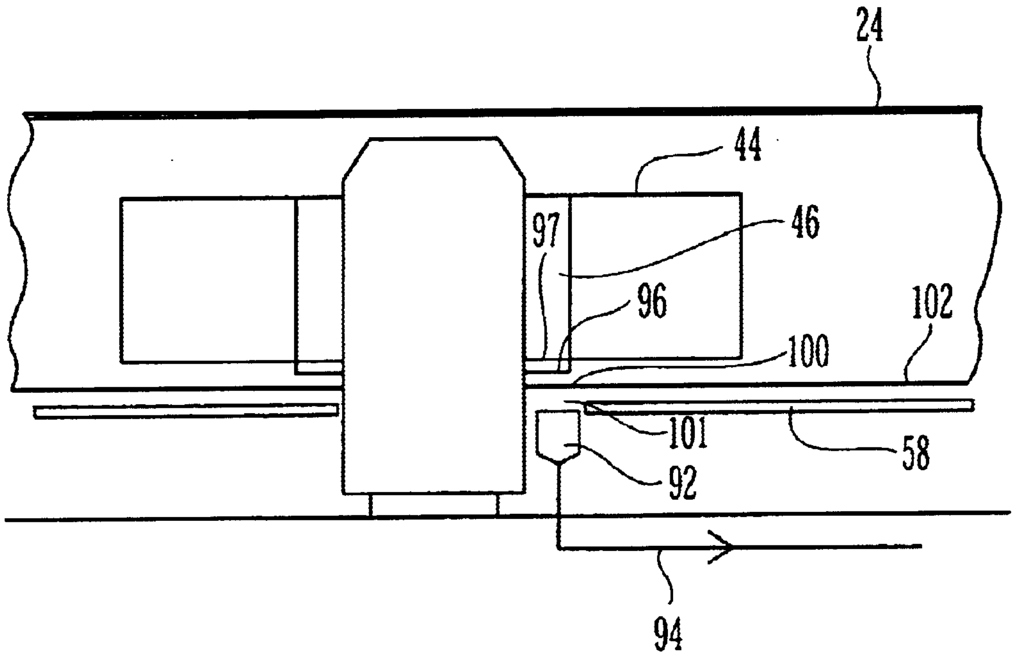
FIG. 5 shows a third arrangement for determining the mode of operation of the tape printing apparatus.

A modification of the embodiment shown in FIG. 4 is illustrated in FIG. 5. This Figure shows a cross-sectional view through part of the cassette receiving bay 18 with an ink ribbon cassette 24 in position. In this embodiment, a sensing arrangement 92 having a similar construction to that outlined in relation to the embodiments shown in FIG. 3 and 4 is provided. This sensing arrangement 92 is connected via line 94 to the microprocessor chip 78. In FIG. 5, a cassette 24 is shown in position with the ink ribbon supply reel 46 holding a supply of ink ribbon 44.

An adhesive disc 96 is provided on the bottom 97 of the ink ribbon supply spool 46 supported on the post 82 which is not directly driven as described in relation to the embodiment shown in FIG. 4. The disc 96 has a plurality of reflective bands extending radially thereon interspersed with non-reflective regions. The sensing arrangement 92 is arranged below a window 100 in the lower surface 102 of the cassette 24. This window 100 is of a transparent material so that the sensing arrangement 92 is able to detect the reflective bands on the disc 96. Rotation of the ink ribbon supply spool 46 and the disc 96 can be detected as the light from the light source of the sensing arrangement 92 impinges alternately on the reflective and non-reflective regions of the disc 96. The detector of the sensing arrangement thus receives reflected light when the light impinges on a reflective region and a much smaller amount of light when light from the light source impinges on the non-reflective regions on the disc. Thus, when the ink supply spool 46 rotates, the microprocessor chip 78 will receive a signal which oscillates between a relatively high value and a relatively low value. The high value represents the detection of one of the reflective or non-reflective regions and the low value represents the detection of the other of the reflective or non-reflective regions. In the absence of an ink ribbon supply spool 46, the microprocessor chip will receive a signal having a generally constant value. If rotation of the disc 96 is determined, the microprocessor chip 78 can determine that the tape printing apparatus 2 is to have the first mode of operation. However, if no rotation is detected, as a consequence of there being no ink ribbon 44 present, the tape printing apparatus 2 determines that the tape apparatus should have a second mode of operation.

It should be appreciated that the embodiment described in relation to FIG. 5 can be modified so that the disc 96 is provided on the bottom of the ink ribbon take up spool 48. As with the embodiment described in relation to FIG. 3, the speed of rotation of the take up spool 48 will rotate more slowly than if no ink ribbon is present. A determination can thus be made as to which mode of operation the tape printing apparatus 2 should have.

The problem of tape wastage can be dealt with in a similar way to that outlined in relation to the embodiment shown in FIG. 3. For example, as with the embodiment shown in FIG. 3, the amount of tape wasted can be reduced particularly if the apparatus only carries out checks to ascertain the mode of operation only if a condition indicative that a cassette is likely to have been changed is detected.

An alternative embodiment of the present invention is shown in FIGS. 6*a* to *c*. These figures illustrate sectional views through part of the cassette 24 holding the ink ribbon and part of the cassette receiving bay 18. In this embodiment, the cassette 24 housing the ink ribbon 44 is modified so as to include a recess 104. This recess 104 opens on the lower surface 106 of the ink cassette 24. The recess 104 is adjacent a slot 108 defined in the cassette. A blade is arranged to move into the slot so as to cut off a label on which an image has been printed. It should be appreciated that the opening of the slot 108 extends perpendicular to the opening of recess 104. The position of the ink ribbon 44 is indicated in these Figures.

The cassette receiving bay floor 58 has an opening 113 through which a pivotably mounted lever 110 is mounted. The lever 110 pivots about point 112, The lower end 114 of the lever 110 is in contact with a depressable microswitch 116.

The operation of this embodiment will now be described. As the cassette 24 is moved downwardly into the cassette receiving bay 18, the upper end 118 of the lever 110 enters the recess 104 to adopt the position shown if FIG. 6*b*. In that position, the lever 110 is substantially vertical. However, once the ink ribbon is driven by the platen 30 cooperating with the print head 28, the slack in the ink ribbon 44 is taken up so that it is no longer slack. When the slack in the ink ribbon is taken up, the ink ribbon 44 acts against the lever 110 to cause it to pivot in the direction of arrow A about pivot point 112. The lower end 114 of the lever 110 then depresses the microprocessor chip 78. As the lever 110 is only moved into the position shown in FIG. 6*c* when the ink ribbon is present, the microprocessor chip 78 can determine whether the tape printing apparatus should be in a first or second mode of operation. It should be appreciated that the surface 120 of the lever 110 which comes into contact with the ink ribbon has a curved profile so as not to damage the ink ribbon.

The problems of tape wastage can be dealt with in a similar manner to that outlined in respect of the embodiment described in relation to FIG. 3.

Figure 7A:
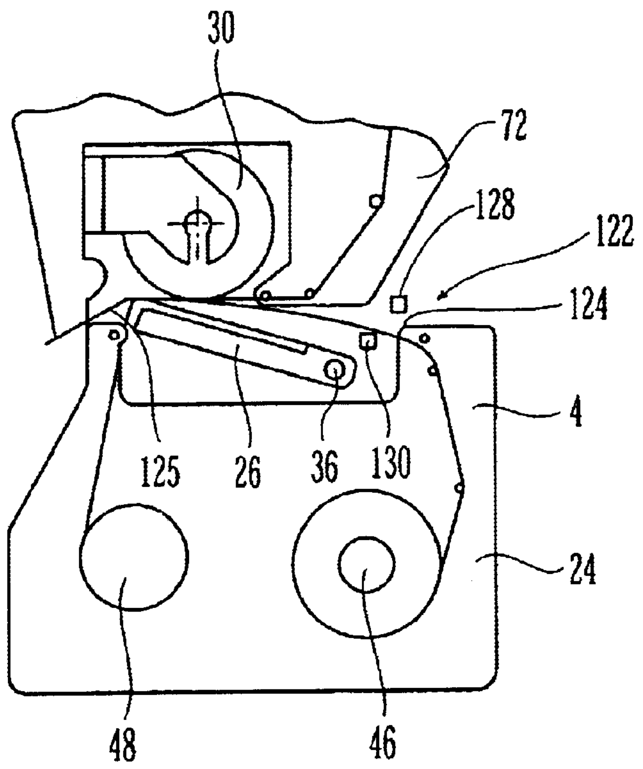
FIG. 7*a* shows a fifth arrangement for determining the mode of operation of the tape printing apparatus.

FIG. 7*a* shows a further embodiment of the present invention and in particular is a plan view of part of the cassette receiving bay 18 with two cassettes 22 and 24 present. In this embodiment, a sensor 122 is provided between the outlet 124 for the ink ribbon of the ink ribbon cassette 24 and the inlet 125 for allowing the ink ribbon 44 back into the cassette 24 to the take up reel 48. This sensor 122 comprises a light source 128 which may be in the form of light emitting diode and a detector 130 for detecting light emitted by the light source 128. This detector may take the form of a photo detector. The light source 128 and the detector 130 are arranged on opposite sides of the ink ribbon path. If an ink ribbon 44 is present, the light path between the light source 128 and the light detector 130 will be blocked by the ink ribbon 44. If on the other hand there is no ink ribbon present 44, the light path between the light source 128 and the light detector 130 would not be blocked. Signals from the detect 130 indicative of the presence or absence of ink ribbon are passed to the microprocessor chip 78. The microprocessor chip 78 is then able to determine the mode of operation of the tape printing apparatus 2.

In one modification to this embodiment, the light source and detector are arranged on the same side of the ink ribbon path. When ink ribbon is present, light from the light source is reflected back to the detector. When no ink ribbon is present, the amount of light received by the detector may be reduced. The ink ribbon may have a coating to increase the amount of light reflected back to the detector.

Figure 7B:
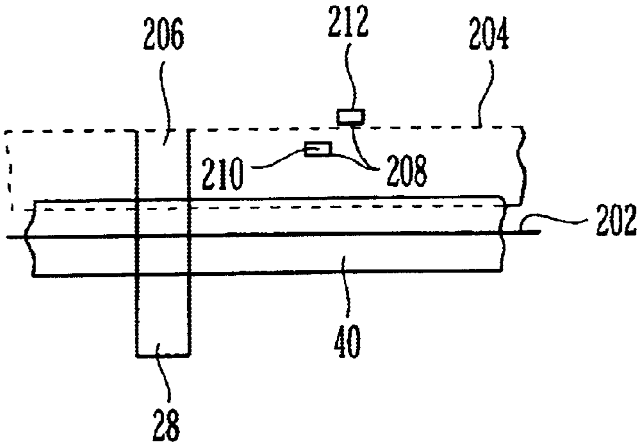
FIG. 7*b* shows a sixth arrangement for determining the mode of operation of the tape printing apparatus.

FIG. 7*b* shows another embodiment of the present invention and illustrates schematically a portion of the path for the image receiving tape. In the first mode of operation, the image receiving tape (shown in solid lines) is arranged to be centered on the print head 28. In other words, the center line passing lengthwise along the center of the image receiving tape coincides with the center line 202 of the print head 28. In the second mode of operation, the top edge 204 of the thermally sensitive image receiving tape is aligned with the top 206 of the print head. The thermally sensitive image receiving tape is shown in dotted lines in FIG. 7*b*. A sensor arrangement 208 is provided. The sensor arrangement 208 is arranged so as to be near the upper edge 204 of the thermally sensitive image receiving tape, when present. Thus, when a thermally sensitive image receiving tape is present, the path between the light source 210 and the fight detector 212 is blocked by the thermally sensitive image receiving tape. However, when an image receiving tape suitable for use in a thermal transfer printing mode is present, the light path between the light source 210 and the light detector 212 is not blocked. The detector arrangement 208 is connected to the microprocessor chip 78 which is able to determine whether the image receiving tape present is for use in a thermal transfer mode of printing or a direct thermal mode of printing and hence the mode of operation of the print head. In this embodiment, the cassettes are suitably modified so that the image receiving tapes 40 adopt the correct position relative to the print head. It should also be appreciated that in this embodiment the print head 28 would have a greater height than the widths of the image receiving tape usable with the print head.

In a further modification to this embodiment, the image receiving tape usable in the thermal transfer mode can be aligned with the bottom edge of the print head. A further or alternative sensor arrangement might be provided in order to determine the presence or absence of such an image receiving tape.

In one modification to the embodiments shown in FIGS. 7*a* and 7*b*, the path of the image receiving tape is altered depending on whether or not the image receiving tape is of a thermally sensitive material or requires the presence of an ink ribbon. The tape printing apparatus is arranged to determine which path is followed by the image receiving tape and hence whether the tape printing apparatus is to have the first or second mode of operation. Any suitable method can be used for detecting the path of the image receiving tape. In one embodiment of the present invention, the path of the image receiving tape is altered within the cassette. The cassettes are generally the same regardless of whether or not the cassette holds supply of thermally sensitive image receiving tape or a supply of image receiving tape suitable for use in a thermal transfer printing method. However, two openings are provided in the cassette, the openings being provided along a portion of the path of the respective tapes. In other words, one opening is provided below the portion of the tape path for the thermally sensitive image receiving tape whilst the other opening is provided below the portion of the path for the image receiving tape suitable for use in the thermal transfer printing mode. Sensors, for example in the form of microswitches, are mounted so as to extend above the floor of the cassette receiving bay. In particular, these senors are aligned with the openings. Thus, one sensor will extend into one of the openings and one sensor will be prevented from extending into the other opening by the tape. The microprocessor chip 78 can thus make a determination as to which sensor extends into an opening and which sensor is prevented from extending into an opening. It can therefore be determined whether the cassette contains thermally sensitive image receiving tape or image receiving tape or image receiving tape requiring an ink ribbon and hence the mode of operation of the print head. The path of the image receiving tape in the cassette is altered by suitable guide means provided inside the cassette.

Whilst all of the previous embodiments have been describe in relation to a system which uses two separate cassettes in the thermal transfer printing mode, it should be appreciated that these embodiments can be modified so as to be used with a system which uses a single cassette at all times. In this alternative embodiment, the ink ribbon 44 when present and the image receiving tape 40 would be housed in a single cassette.

Figure 8A:
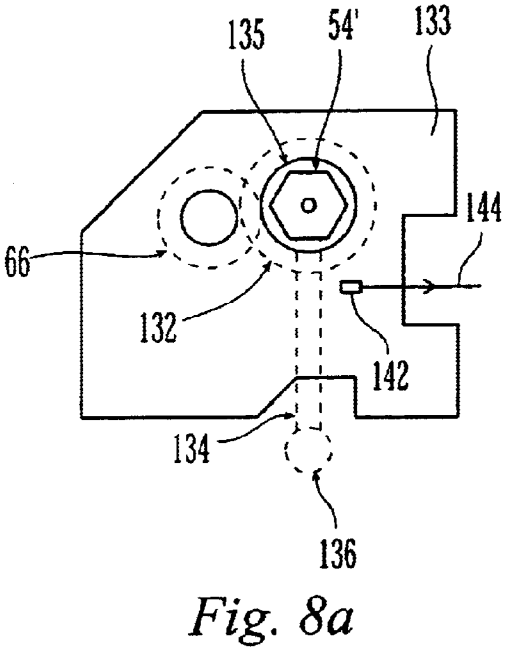
FIGS. 8*a* and 8*b* show a seventh arrangement for determining the mode of operation of the tape printing apparatus.

Reference will now be made to a further embodiment of the invention which is shown in FIGS. 8*a* and *b*. This embodiment is particularly suitable for embodiments of the present invention where a single cassette is used to house both the image receiving tape 40 and the ink ribbon 44 in the thermal transfer mode of printing. FIGS. 8*a* and *b* show a plan view of part of the cassette receiving bay with a cassette in position.

FIGS. 8*a* and *b* show a rewind sprocket 54' for the ink ribbon take up supply 48. The rewind sprocket 54' is connected to a sprocket gear 132. This sprocket gear 132 differs from that shown in FIG. 3 in that the sprocket gear 132 is mounted on an are 134 which is pivotable about a pivot pin 136. This sprocket gear 132 engages with an idler gear 66, as in the embodiment shown in FIG. 3. The sprocket gear 132, idler gear 66, sprocket mounting arm 134 and pivot pin are all arranged below the floor of the cassette receiving bay. In FIG. 8*a*, a cassette 133 including an ink ribbon 44 as well as an image receiving tape 40 is mounted in the cassette receiving bay. The cassette 133 has a hole 135 to receive the rewind sprocket 54' which engages with the ink ribbon take-up supply 48.

Figure 8B:
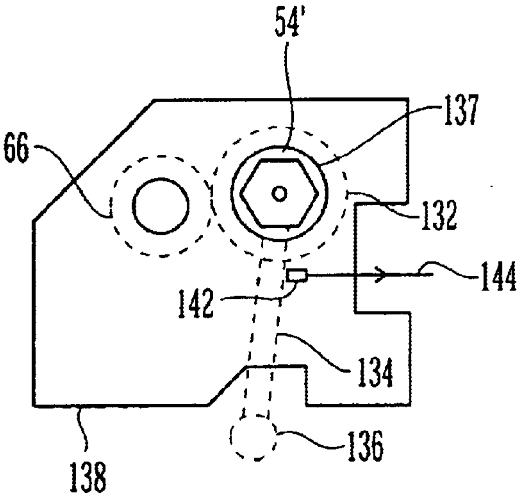

In FIG. 8*b*, a cassette 138 containing only an image receiving tape 40 of a thermally sensitive nature is in place. The hole 137 defined in the cassette 138 to receive the rewind sprocket 54' is offset with respect to the hole 135 defined in the cassette shown in FIG. 8*a*. When the cassette 138 is inserted, the sprocket gear 132 which is mounted on the sprocket mounting arm is pivoted about pivot pin 136 to a position where the sprocket gear 132 is no longer engaged with the remainder of the gear train. As the cassette 138 does not contain ink ribbon, the sprocket gear 132 does not need to be engaged with the remainder of the gear train in order to take up the ink ribbon. The position of the sprocket gear 132 can be determined by a microswitch 142. The microswitch 142 is only actuated when the sprocket gear 132 is in the position shown in FIG. 8*b*. This microswitch 142 is connected via line 144 to the microprocessor chip 78 which is able to determine from the signals provided by the microswitch 142 whether the tape printing apparatus 2 is to be controlled to be in the first mode of operation or the second mode of operation. It should be appreciated that any other appropriate method can be sued to ascertain the position of the rewind sprocket and hence the mode of operation for the tape printing apparatus.

Chamfering may be provided at the upper end of the rewind sprocket 54' to encourage the rewind sprocket 54' to be received in the offset recess 137 of the cassette 138. It has been found that a maximum actual displacement of the rewind sprocket 54' of about 2 to 2½ millimeters would be sufficient in order to distinguish the two modes of operation.

Figure 9:
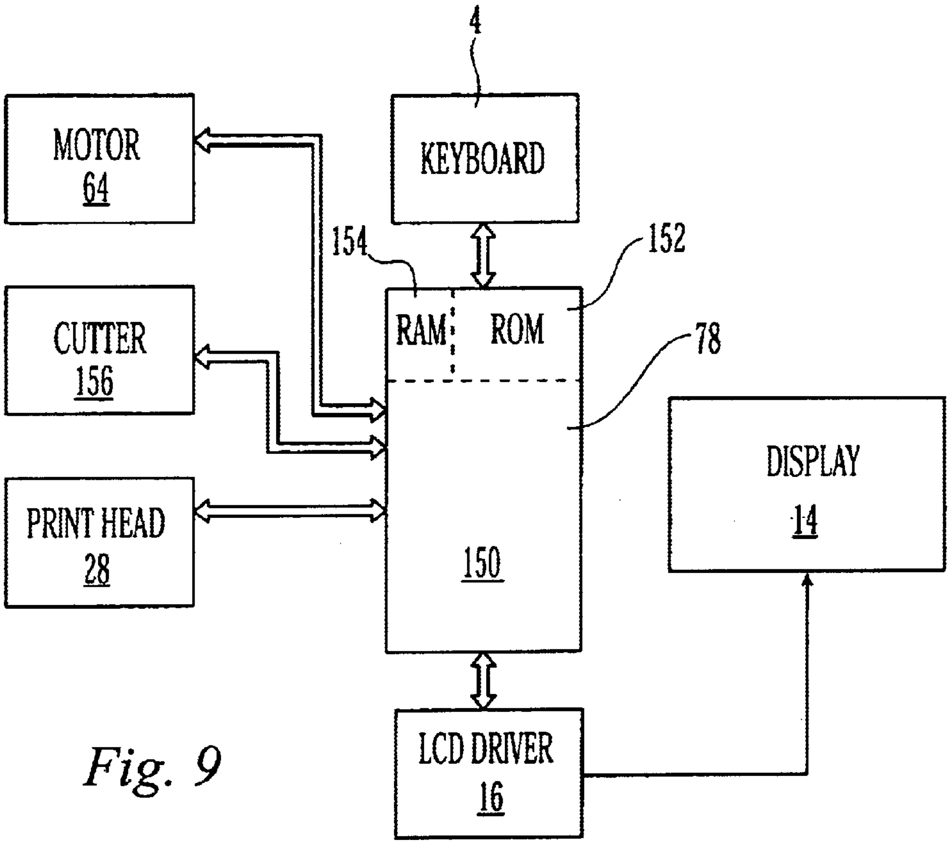
FIG. 9 is a simplified block diagram of control circuitry for controlling the tape printing apparatus.

Reference will now be made to FIG. 9 which shows the basic control circuitry for controlling the tape printing apparatus 2 as shown in the previous Figures. The microprocessor chip 78 has a read only memory (ROM) 152, a microprocessor 150 and random access memory capacity 154 indicated diagrammatically by RAM. The microprocessor 150 is controlled by programming stored in the ROM 152 and when so control acts as an controller. The microprocessor chip 78 is connected to receive label data input to it form the keyboard 4. The microprocessor chip 78 outputs data to drive the display 14 via the display driver chip 16 to display a label to be printed (or a part thereof) and/or a message or instructions for the user. It should be appreciated that the display driver 16 may form part of the microprocessor chip 78. The microprocessor chip 78 also outputs data to drive the print head 28 to print an image onto the image receiving tape 40 to form the label.

The microprocessor chip 78 also controls the motor 64 for driving the image receiving tape 40 through the tape printing apparatus 2. The motor 64 may be a dc motor which continuously drives the image receiving tape 40 through the print zone 32 during printing. Alternatively, the motor may be a stepper motor. In this situation, the platen 30 rotates stepwise to drive the image receiving tape 40 in steps through the print zone 32 during the printing operation.

The microprocessor chip 78 may also control a cutting mechanism 156 to allow lengths of image receiving tape to be cut off after an image has been printed thereon. The cutting mechanism 156 may alternatively be manually operated. In one embodiment of the invention illustrated in FIG. 2, the cutting mechanism 156 comprises a cutter support member 158 which carries a blade 160. The blade 160 then acts against an anvil 162. However, as shown in FIGS. 5, 6*a* to 6*c*, the blade 160 may alternatively be arranged to cut into a slot defined in the wall of the cassette.

It should be appreciated that features of each of the described embodiments may be used in conjunction with features of other of the described embodiments.

What is claimed is:

1. A tape printing apparatus for printing an image on an image receiving tape comprising:

a thermal print head for printing an image on an image receiving tape, said thermal print head having a first mode of operation and a second mode of operation;

receiving means for receiving in said first mode of operation a supply of image receiving tape and a supply of ink ribbon for providing an image on the image receiving tape, and in second mode of operation a supply of thermally sensitive image receiving tape;

driving means for driving the ink ribbon;

control means for controlling said thermal print head, and detecting means for detecting a characteristic indicative of movement of the ink ribbon to determine if an ink ribbon is present or absent in said receiving means and for providing a signal to said control means indicative of the presence or absence of the ink ribbon, said control means acting to control said thermal print head to operate in said first mode of operation when the ink ribbon is present and in said second mode of operation when the ink ribbon is not present.

2. A tape printing apparatus as claimed in claim 1, further comprising:

a rotatable support member, wherein the ink ribbon is mounted on said rotatable support member, and said detecting means is positioned to detect a characteristic indicative of rotational movement of the ink ribbon.

3. A tape printing apparatus as claimed in claim 2, wherein said rotatable support member has a first speed of rotation when the ink ribbon is present and a second speed of rotation when no ink ribbon is present, and said detecting means is positioned to detect a characteristic indicating the speed of rotation of said rotatable support member.

4. A tape printing apparatus as claimed in claim 3, wherein said rotatable support means is driven by said driving means, said rotatable support means rotating more quickly when no ink ribbon is present as compared to when the ink ribbon is present.

5. A tape printing apparatus as claimed in claim 3, wherein said support member for supporting the supply of the ink ribbon is freely rotatable such that the rotatable support member is substantially stationary when no ink ribbon is present and rotates when the ink ribbon is present.

6. A tape printing apparatus as claimed in claim 3, further comprising:

a reel for the ink ribbon, wherein, in use, said reel is supported on said rotatable support member, and wherein said detecting means are positioned to monitor the speed of rotation of said reel to thereby provide an indication of the speed of rotation of said support member.

7. A tape printing apparatus as claimed in claim 6, wherein said reel is provided with a surface having a plurality of markings, said detecting means being positioned to detect the markings as the reel rotates with the rotatable support means to provide an indication of the speed of the rotatable support means.

8. A tape printing apparatus as claimed in claim 7, further comprising a cassette for use in a printing apparatus comprising a housing in which a reel holding a supply of ink ribbon is arranged, said reel being rotatable with respect to said housing and having a plurality of markings thereon, said housing being arranged so that said markings are detectable by the detecting means external to said cassette to provide information relating to the rotation of said reel, wherein the cassette is operably attached to the tape printing apparatus.

9. A tape printing apparatus as claimed in claim 3, wherein said rotatable support member includes a member, and wherein said member rotates with said rotatable support member, and said detecting means is positioned to detect the rotation of said member to provide an indication of the speed of the rotatable support member.

10. A tape printing apparatus as claimed in claim 9, wherein said member comprise a disc having a plurality of markings and the detecting means is positioned to detect the markings as the disc rotates with the rotatable support member to provide an indication of the speed of the support member.

11. A tape printing apparatus as claimed in claim 10, wherein said markings comprise a plurality of holes in said disc and said detecting means comprises a light source and a detector.

12. A tape printing apparatus as claimed in claim 2, further comprising:

take up means for taking up the ink ribbon, wherein said rotatable support member is positioned to support said take up means, when present, after the ink ribbon has been driven by said driving means past said print head.

13. A tape printing apparatus as claimed in claim 2, further comprising:

a slipping clutch, wherein said driving means includes a driving gear, said rotatable support member is coupled via said slipping clutch to said driving gear, whereby when no ink ribbon is present said support member rotates at the same speed as said driving gear and when the ink ribbon is present said slipping clutch slips so that said rotatable support member rotates at a lower speed than said driving gear.

14. A tape printing apparatus as claimed in claim 1, wherein said detecting means comprises a movable member having a first position when the ink ribbon is present and a second position when no ink ribbon is present, and the detecting means is positioned to determine the position of said movable member.

15. A tape printing apparatus as claimed in claim 14, wherein said movable member is positioned to be in said second position when a supply of the ink ribbon is present and stationary, and to move to said first position only when the ink ribbon is driven by said driving means.

16. A tape printing apparatus as claimed in claim 1, wherein in said first mode of operation of said print head, said print head energy requirements are at a first level and in said second mode of operation of said print head, said print head energy requirements are at a second level.

17. A tape printing apparatus as claimed in claim 16, wherein said print head energy requirements are changed by altering one or more of the following print head operating parameters:

a voltage applied to each printing element of said print head;

the length of time for which each printing element of said print head is activated; and the number of times that each printing element of said print head is activated for the same set of print data.

18. A tape printing apparatus as claimed in claim 1, wherein in said first mode of operation, the image receiving tape and the ink ribbon are received in a first cassette and in a second cassette, and in said second mode of operation, the image receiving tape is received in a second cassette.

19. A tape printing apparatus as claimed in claim 18, wherein said first cassette has an aperture in a first location for receiving said support member and said second cassette has an aperture for receiving said support member in a second location such that said first cassette causes the rotatable support member to be in said first position and said second cassette causes the support member to be in said second position.

20. A tape printing apparatus as claimed in claim 1, wherein in said first mode of operation, the image receiving tape and the ink ribbon are received in separate cassettes and in said second mode of operation, the image receiving tape is received in a cassette.

21. A tape printing apparatus as claimed in claim 1, wherein said detecting means is positioned to detect a characteristic indicative of the power consumed by said driving means, such that the power consumed is greater when the ink ribbon is present as compared to when no ink ribbon is present.

22. A tape printing apparatus as claimed in claim 21, wherein said characteristic indicative of the power of said driving means is the drive current applied thereto.

23. A tape printing apparatus as claimed in claim 1, further comprising: means for determining when a supply of image receiving tape is first inserted or replaced, whereby the tape printing apparatus is positioned so that the mode of operation of said print head is only determined when said means for determining determines that a supply of image receiving tape has been inserted or replaced.

24. A tape printing apparatus as claimed in claim 1, further comprising:

a platen which is engageable by said thermal printing head during each mode of operation of said thermal printing head.

25. A tape printing apparatus as claimed in claim 24, wherein said platen is mounted for rotation within a cage moulding.

26. A tape printing apparatus for printing a label on an image receiving tape comprising:

a print zone;

a thermal print head located at said print zone for printing the label on the image receiving tape as the image receiving tape passes through said print zone, said thermal print head having a first mode of operation and a second mode of operation;

control means for controlling the thermal print head;

receiving means for receiving in said first mode of operation a supply of image receiving tape and a supply of an ink ribbon for providing an image on the image receiving tape and in said second mode of operation a supply of thermally sensitive image receiving tape;

detecting means for detecting a characteristic indicative of the presence or absence of the ink ribbon and for providing a signal to the control means indicative of the presence or absence of the ink ribbon, wherein said control means controls the print head to have said first mode of operation when ink ribbon is present and said second mode of operation when no ink ribbon is present;

cutting means for separating the printed label from the supply of the image receiving tape; and a support member to support the ink ribbon, wherein said support member having a first position when the ink ribbon is present and a second position when no ink ribbon is present, said detecting means being positioned to detect a characteristic indicative of the position of said support member to determine if the ink ribbon is present or absent.

27. A tape printing apparatus as claimed in claim 26, further comprising:

driving means for driving the ink ribbon, wherein said support member is a rotatable support member having gear means, said gear means having a first position in which said gear means is coupled to said driving means when the ink ribbon is present and a second position when the ink ribbon is not present, said detecting means being positioned to detect a characteristic indicative of whether said gear means is in said first position or said second position.

28. A tape printing apparatus as claimed in claim 27, wherein said detecting means is positioned to detect the position of the gear means.

29. A tape printing apparatus as claimed in any of claims 27 to 28, wherein said detecting means is positioned to detect the position of the support member.

30. A tape printing apparatus as claimed in claim 26, further comprising:

a platen which is engageable by said thermal printing head during each mode of operation of said thermal printing head.

31. A tape printing apparatus as claimed in claim 30, wherein said platen is mounted for rotation within a cage moulding.

32. A tape printing apparatus for printing an image on an image receiving tape, comprising:

a thermal print head for printing an image on the image receiving tape, said thermal print head having a first mode of operation and a second mode of operation;

receiving means for receiving in said first mode of operation a supply of image receiving tape and a supply of ink ribbon for providing an image on the image receiving tape, and in said second mode of operation a supply of thermally sensitive image receiving tape;

control means for controlling said thermal print head;

means for directing the image receiving tape along a first path in said first mode of operation and the thermally sensitive image receiving tape along a second path in said second mode of operation; and detecting means for determining when the image receiving tape follows said first path or the thermally sensitive image receiving tape follows said second path for providing a signal to said control means indicative of the path of the image receiving tape and the thermally sensitive imaging tape, said control means being positioned to control said thermal print head to operate in said first mode of operation when the image receiving tape follows said first path and said second mode of operation when the thermally sensitive image receiving tape follows said second path.

33. A tape printing apparatus for printing an image on an image receiving tape, comprising:

a thermal print head for printing an image onto the image receiving tape, said thermal print head having a first mode of operation and a second mode of operation;

receiving means for receiving in said first mode of operation a supply of image receiving tape and a supply of ink ribbon for providing an image on the image receiving tape, and in said second mode of operation a supply of thermally sensitive image receiving tape;

control means for controlling said thermal print head;

driving means for driving the image receiving tape and the ink ribbon, when present, past said thermal print head; and detecting means for detecting a characteristic indicative of the presence or absence of the ink ribbon, and for providing a signal to said control means indicative of the presence or absence of the ink ribbon, said control means controlling said thermal print head to operate in said first mode of operation when the ink ribbon is present and in said second mode of operation when no ink ribbon is present, wherein said detecting means is arranged to detect a characteristic indicative of the power consumed by said driving means, such that said driving means consumes more power when the ink ribbon is present as compared to when no ink ribbon is present.

34. A tape printing apparatus for printing an image on an image receiving tape, comprising:

a thermal print head for printing an image on the image receiving tape, said thermal print head having a first mode of operation and a second mode of operation;

receiving means for receiving in said first mode of operation a supply of the image receiving tape and a supply of ink ribbon for providing an image on the image receiving tape, and in said second mode of operation a supply of thermally sensitive image receiving tape;

control means for controlling said thermal print head;

driving means for driving the image receiving tape and the ink ribbon, when present, past said thermal print head; and detecting means for detecting a characteristic indicative of the presence or absence of the ink ribbon and for providing a signal to said control means indicative of the presence or absence of the ink ribbon, said control means controlling said thermal print head to operate in said first mode of operation when the ink ribbon is present and said second mode of operation when no ink ribbon is present, and said detecting means is positioned to detect a characteristic of the load applied to said driving means, such that the load applied to said driving means is greater when the ink ribbon is present as compared to when no ink ribbon is present.

* * * * *